Figure 1:
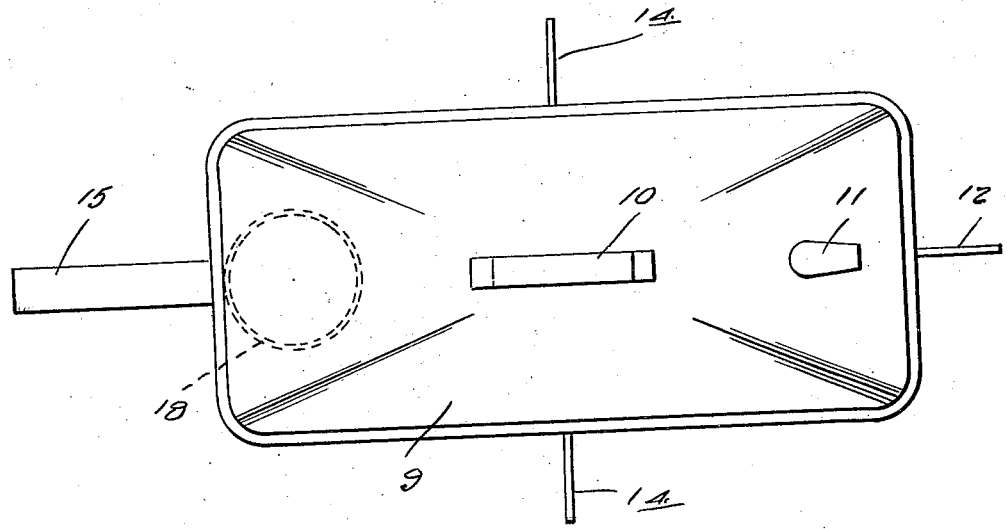

April 22, 1930.  F. A. ARMSTRONG  1,755,420
STERILIZING PAN AND BOTTLE HOLDER
Filed March 16, 1929  2 Sheets-Sheet 1

Inventor
F. A. Armstrong

By Clarence A. O'Brien
Attorney

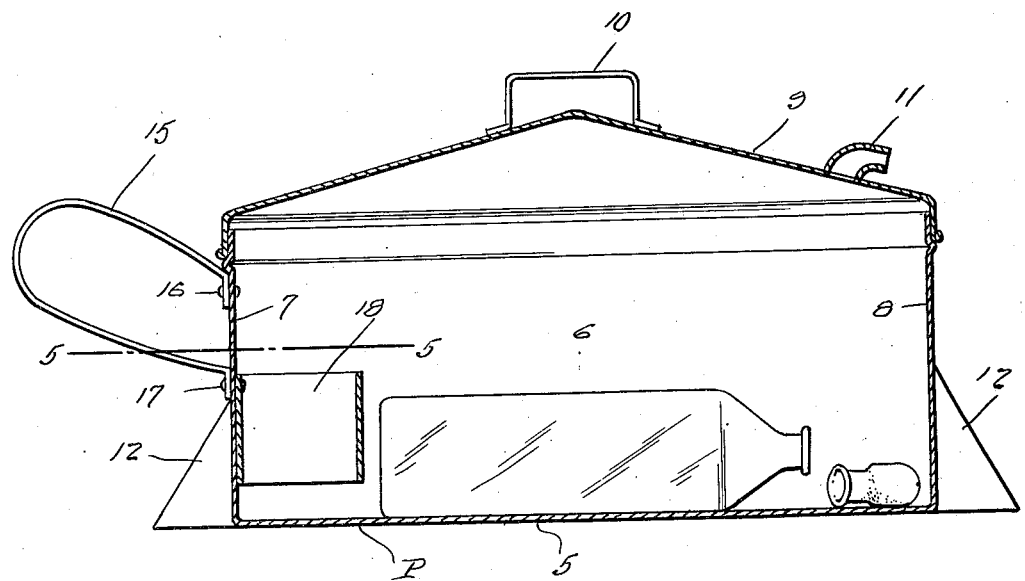
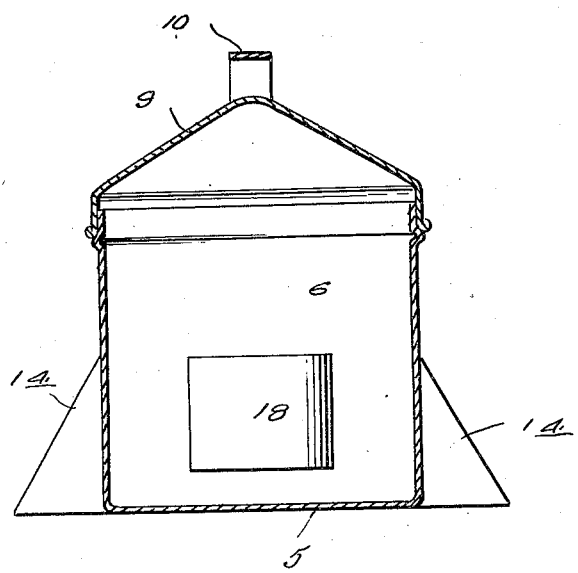
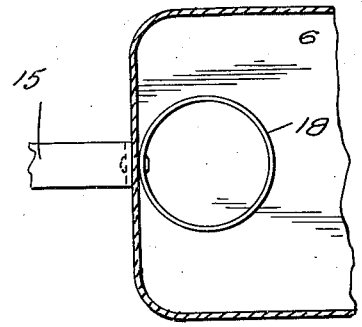

Patented Apr. 22, 1930

1,755,420

UNITED STATES PATENT OFFICE

FREDRICK A. ARMSTRONG, OF KIRKSVILLE, MISSOURI

STERILIZING PAN AND BOTTLE HOLDER

Application filed March 16, 1929. Serial No. 347,579.

The present invention relates to a combined sterilizing pan and bottle holder particularly adapted for use in sterilizing nursing bottles and holding the bottle when filling the same and the like.

An important object of the invention resides in the provision of a structure of this nature which cannot be easily tilted over, simple in its construction, inexpensive to manufacture, strong and durable, thoroughly efficient and reliable in use, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

Figure 4:
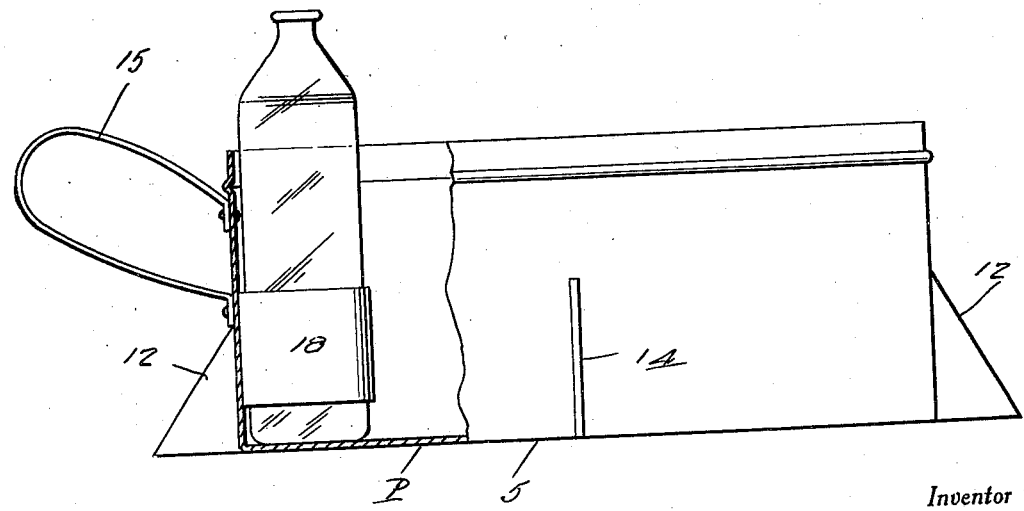

In the drawing:

Figure 1 is a top plan view of the apparatus embodying the features of my invention, Figure 2 is a vertical longitudinal section therethrough, Figure 3 is a vertical transverse section therethrough, Figure 4 is a side elevation thereof with the lid removed and showing one end in vertical section, and Figure 5 is a detail section taken substantially on the line 5—5 of Figure 2.

Referring to the drawing in detail it will be seen that the letter P denotes generally an oblong pan including a bottom 5, side walls 6, and end walls 7 and 8. The numeral 9 denotes a lid telescopically engaged over the upper end of the walls 7 and 8 and having a handle 10 and a curved spout 11.

Wings 12 project outwardly from the walls 7 and 8 and wings 14 project outwardly from the centers of the walls 6. A handle 15 is riveted as at 16 and 17 to the wall 7. A band or ring 18 is secured to the inside of the wall 7 by the rivets 17.

Obviously the bottle may be sterilized in the usual well known manner when in the position shown in Figure 2. When it is desired to fill the bottle, of course the lid 9 is removed and the bottle placed in the band or ring as is shown to advantage in Figure 4.

The wings 12 and 14 prevent the bottle from tipping over enabling it to be placed on practically any stove for heating the water during sterilization.

It is thought that the construction, utility and advantages of this invention will now be quite apparent to those skilled in this art without a more detailed description thereof.

The present embodiment of the invention has been disclosed in considerable detail merely for the purpose of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In combination, a pan, a wing projecting outwardly from the pan, said wing being of right triangular formation with its shorter leg coplanar with the bottom of the pan and its hypotenuse inclining outwardly and downwardly with respect to a wall of the pan while its longer leg is secured to said wall of the pan.

2. In combination, a pan, a pair of wings projecting outwardly from the sides of the pan, a pair of wings projecting outwardly from the ends of the pan, said wings being of right triangular formation with their shorter legs coplanar with the bottom of the pan and their hypotenuses inclining outwardly and downwardly with respect to the walls of the pan while their longer legs are secured to the walls of the pan.

3. In combination, a pan, a pair of wings projecting outwardly from the sides of the pan, a pair of wings projecting outwardly from the ends of the pan, a handle on one end wall of the pan, rivets for holding the handle in place, a ring inside of said pan on said one wall and held in place by one of said rivets.

4. In combination, a pan, a pair of wings projecting outwardly from the sides of the pan, a pair of wings projecting outwardly from the ends of the pan, a handle on one end wall of the pan, rivets for holding the handle in place, a ring inside of said pan on said one wall and held in place by one of said rivets, a lid for said pan, said lid being provided with a spout.

In testimony whereof I affix my signature.

FREDRICK A. ARMSTRONG.